US012583585B2

(12) United States Patent
Vassberg et al.

(10) Patent No.: US 12,583,585 B2
(45) Date of Patent: Mar. 24, 2026

(54) BLENDED WING BODY AIRCRAFT WITH REAR ENGINES

(71) Applicant: JetZero, Inc., Long Beach, CA (US)

(72) Inventors: John Charles Vassberg, Long Beach, CA (US); Mark Allan Page, Orange, CA (US); Blaine Knight Rawdon, Riverside, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/418,643

(22) Filed: Jan. 22, 2024

(65) Prior Publication Data

US 2025/0236387 A1 Jul. 24, 2025

(51) Int. Cl.
*B64C 39/10* (2006.01)
*B64D 27/14* (2006.01)

(52) U.S. Cl.
CPC .............. *B64C 39/10* (2013.01); *B64D 27/14* (2013.01); *B64C 2039/105* (2013.01)

(58) Field of Classification Search
CPC .... B64C 39/10; B64C 2039/105; B64D 27/14
See application file for complete search history.

(56) References Cited

U.S. PATENT DOCUMENTS

| | | | |
|---|---|---|---|
| 4,524,929 A | | 6/1985 | Gebhard |
| 5,893,535 A | * | 4/1999 | Hawley ..................... B64C 3/00 244/119 |
| 6,568,632 B2 | | 5/2003 | Page et al. |

| | | | |
|---|---|---|---|
| 6,666,406 B2 | | 12/2003 | Sankrithi et al. |
| 6,772,977 B2 | | 8/2004 | Dees et al. |
| 6,923,403 B1 | * | 8/2005 | Dizdarevic ........... B64C 1/0009 244/36 |
| 7,093,798 B2 | | 8/2006 | Whelan et al. |
| 8,366,050 B2 | | 2/2013 | Odle et al. |
| 8,651,416 B2 | * | 2/2014 | Journade ................ B64D 27/18 244/54 |
| 9,387,930 B2 | | 7/2016 | Dornwald et al. |
| 9,499,256 B2 | | 11/2016 | Nakashima et al. |
| 9,611,039 B2 | | 4/2017 | Lieven et al. |
| 10,336,458 B2 | | 7/2019 | Guillemaut et al. |
| 10,647,440 B2 | | 5/2020 | Bouchet et al. |
| 11,136,114 B2 | | 10/2021 | Rowlands et al. |
| 11,186,359 B2 | | 11/2021 | Page |
| 11,247,776 B2 | | 2/2022 | Princen et al. |

(Continued)

FOREIGN PATENT DOCUMENTS

| | | |
|---|---|---|
| GB | 2410728 A | 8/2005 |
| WO | 2007117260 A2 | 10/2007 |

OTHER PUBLICATIONS

US 8,226,035 B1, 07/2012, Kismarton et al. (withdrawn)

(Continued)

*Primary Examiner* — William L Gmoser

(74) *Attorney, Agent, or Firm* — Jeffrey Schox

(57) ABSTRACT

Disclosed herein is an aircraft with engines positioned so as to avoid damage to other components of the aircraft. The aircraft may include a blended wing body aircraft. The engines may be positioned aft of a pressure vessel of the aircraft. The engines may be positioned aft of and/or above a fuel store of the aircraft. Such engine positioning may reduce the likelihood of damage to a pressure vessel and/or fuel store in the event of engine failure.

20 Claims, 8 Drawing Sheets

(56) References Cited

U.S. PATENT DOCUMENTS

| | | | |
|---|---|---|---|
| 11,396,365 | B2 | 7/2022 | Page |
| 11,453,483 | B2 | 9/2022 | Page |
| 11,801,932 | B2 | 10/2023 | Schuster et al. |
| 11,827,339 | B1 | 11/2023 | Page |
| 2002/0145075 | A1* | 10/2002 | Page ..................... B64U 10/20 244/36 |
| 2007/0057117 | A1 | 3/2007 | Payen et al. |
| 2007/0284477 | A1* | 12/2007 | Guering ................ B64D 27/14 244/54 |
| 2008/0230654 | A1* | 9/2008 | Velicki ................. B64D 37/04 244/135 R |
| 2009/0187293 | A1 | 7/2009 | Trotter et al. |
| 2010/0043450 | A1* | 2/2010 | Marche ................. B64C 39/10 60/797 |
| 2010/0108802 | A1* | 5/2010 | Marche ................. B64D 27/20 244/54 |
| 2011/0139925 | A1* | 6/2011 | Lisiewicz ............ B64D 27/406 244/54 |
| 2013/0001356 | A1 | 1/2013 | Sandín et al. |
| 2013/0099053 | A1 | 4/2013 | Barmichev et al. |
| 2014/0130512 | A1* | 5/2014 | Chouard ................ B64D 27/14 60/797 |
| 2018/0001999 | A1 | 1/2018 | Page |
| 2019/0276135 | A1 | 9/2019 | van Merkensteijn, IV |
| 2019/0389581 | A1 | 12/2019 | Chittick et al. |
| 2020/0207476 | A1* | 7/2020 | Whitlock ................. B64C 1/10 |
| 2021/0024203 | A1 | 1/2021 | Chappell et al. |
| 2022/0001974 | A1* | 1/2022 | Page ..................... B64C 25/04 |
| 2022/0063822 | A1 | 3/2022 | Dakhil |
| 2022/0097836 | A1* | 3/2022 | Matsui ................. B64C 27/467 |
| 2022/0348318 | A1 | 11/2022 | Howell et al. |
| 2022/0380027 | A1 | 12/2022 | Whitlock et al. |
| 2022/0388633 | A1* | 12/2022 | Page ..................... B64C 39/10 |
| 2023/0002037 | A1 | 1/2023 | Page |
| 2023/0242246 | A1 | 8/2023 | Page et al. |
| 2023/0264801 | A1* | 8/2023 | Lazzara ................. B64C 39/10 244/130 |
| 2023/0322382 | A1 | 10/2023 | Dindar et al. |
| 2023/0348090 | A1 | 11/2023 | O'Leary et al. |
| 2023/0348091 | A1 | 11/2023 | Kawai et al. |
| 2024/0077020 | A1* | 3/2024 | Mochrie ............... B64D 27/33 |

OTHER PUBLICATIONS

Taufiq Mulyanto; M. Luthfi Imam Nurhakim , Conceptual Design of Blended Wing Body Business Jet Aircraft, Dec. 31, 2013.
Bruce I. Larrimer, Beyond Tube-and-Wing, Dec. 31, 2013.
Randhir Brar, Design of a Blended Wing Body Aircraft, Dec. 31, 2014.
N/A, B-2 Spirit Departure |Great View Of Landing Gear Retraction| Stewardess | Cabin Crew Life |#Shorts, Oct. 2, 2021.
Fabrizio Rizzi, Landing Gear Design for Blended Wing Body Flight Test Demonstrators, Nov. 30, 2018.
Sunpeth Cumnuanti, Landing Gear Conceptual Design and Structural Optimization of a Large Blended Wing Body Civil Transport Aircraft, Dec. 31, 2015.
Larrimer, Beyond Tube-and-Wing, (book), NASA Aeronautics Book Series, Dec. 7, 2020.
X-48 Blended Wing Body (BWB), (webpage), https://www.globalsecurity.org/military/systems/aircraft/x-48.htm.

* cited by examiner

208/212

204b

204a

BLENDED WING BODY AIRCRAFT WITH REAR ENGINES

FIELD OF THE INVENTION

The present invention generally relates to the field of blended wing body aircraft. In particular, the present invention is directed to blended wing body aircraft with rear engines.

BACKGROUND

Typical tube and wing aircraft include wing mounted engines. These engines are ordinarily not aft of the pressure vessel containing a passenger compartment. Engine failure may present safety hazards such as debris which may impact components of the aircraft.

SUMMARY OF THE DISCLOSURE

In an aspect, a blended wing body aircraft may include a main body comprising a pressure vessel, wherein the pressure vessel comprises a rear pressure bulkhead; a port wing and a starboard wing connected to the main body; and a first engine, wherein the entirety of the first engine is positioned aft of the entirety of a rear pressure bulkhead of the pressure vessel.

In another aspect, a blended wing body aircraft may include a main body comprising a pressure vessel, wherein the pressure vessel comprises a rear pressure bulkhead; a port wing and a starboard wing connected to the main body; and a first engine, wherein the first engine comprises a high pressure turbine and a low pressure turbine, wherein the high pressure turbine is configured to spin faster than the low pressure turbine, wherein the high pressure turbine is positioned aft of the entirety of a rear pressure bulkhead of the pressure vessel.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure relate to an aircraft with rear engines. The aircraft may include a blended wing body aircraft. The aircraft may include one or more engines, a pressure vessel, and/or a fuel store. One or more engines may be positioned aft of and/or above a pressure vessel and/or a fuel store. Such positioning may decrease risk associated with engine malfunction, as pressure vessel and/or fuel store may be outside of an engine's rotor burst zone and/or in a low risk zone of an engine's rotor burst zone. Such positioning may mean there is a lower risk that debris from a malfunctioning engine impacts pressure vessel and/or fuel store.

Figure 1:
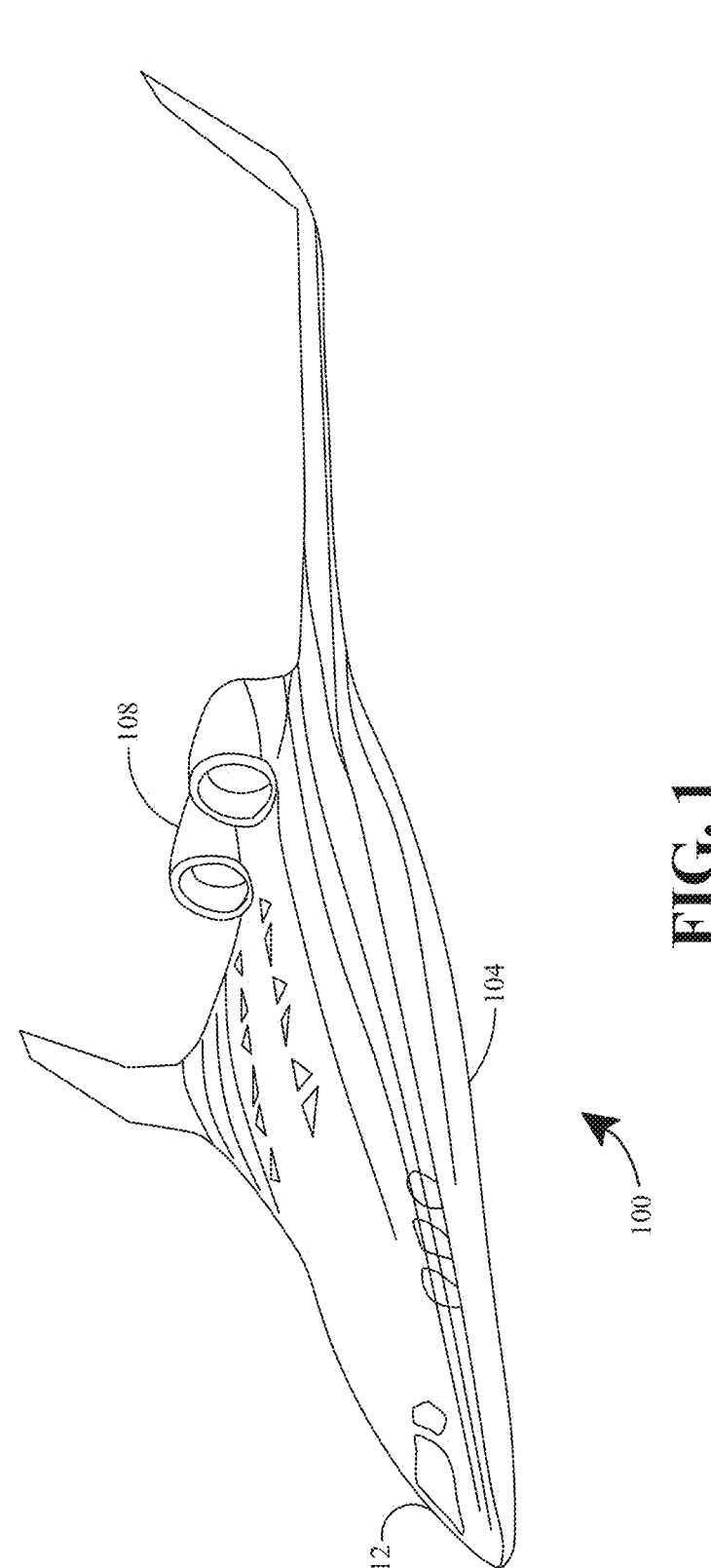
FIG. 1 is a schematic of an exemplary blended wing body aircraft.

Referring to FIG. 1, an exemplary blended wing aircraft 100 is illustrated. Aircraft 100 may include a blended wing body 104. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 104 aircraft may have distinct wing and body structures, which are smoothly blended together with no clear dividing line or boundary feature between wing and fuselage. This contrasts with a flying wing, which has no distinct fuselage, and a lifting body, which has no distinct wings. In some embodiments, a BWB 104 may have no clear or abrupt demarcation between wings and a main body of the aircraft along a trailing edge of the aircraft. A BWB 104 design may or may not be tailless. One potential advantage of a BWB 104 may be to reduce wetted area and any accompanying drag associated with a conventional wing-body junction. In some cases, a BWB 104 may also have a wide airfoil-shaped body, allowing entire aircraft to generate lift and thereby facilitate reduction in size and/or drag of wings. In some cases, a BWB 104 may be understood as a hybrid shape that resembles a flying wing, but also incorporates features from conventional aircraft. In some cases, this combination may offer several advantages over conventional tube-and-wing airframes. In some cases, a BWB airframe 104 may help to increase fuel economy and create larger payload (cargo or passenger) volumes within the BWB. BWB 104 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 1, BWB 104 of aircraft 100 may include a nose portion. A "nose portion," for the purposes of this disclosure, refers to any portion of aircraft 100 forward of the aircraft's fuselage 112. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 1, BWB 104 may include at least a structural component of aircraft 100. Structural components may provide physical stability during an entirety of an aircraft's 100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 100 structure, they may be so named A, B, C, and so on named from nose to tail. Pillars, like any structural element, may be disposed a distance away from each other, along an exterior of aircraft 100 and BWB 104. Depending on manufacturing method of BWB 104, pillars may be integral to frame and skin, comprised entirely of internal framing, or alternatively, may be only integral to structural skin elements. Structural skin will be discussed in greater detail below.

With continued reference to FIG. 1, BWB 104 may include a plurality of materials, alone or in combination, in its construction. At least a BWB 104, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 104 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 104 may additionally or alternatively use wood or another suitably strong yet light material for an internal structure.

With continued reference to FIG. 1, aircraft 100 may include monocoque or semi-monocoque construction. BWB 104 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 1, BWB 104 may include at least a fuselage. A "fuselage," for the purposes of this disclosure, refers to a main body of an aircraft 100, or in other words, an entirety of the aircraft 100 except for nose, wings, empennage, nacelles, and control surfaces. In some cases, fuselage may contains an aircraft's payload. At least a fuselage may comprise structural components that physically support a shape and structure of an aircraft 100. Structural components may take a plurality of forms, alone or in combination with other types. Structural components vary depending on construction type of aircraft 100 and specifically, fuselage. A fuselage 112 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 1, in embodiments, at least a fuselage may comprise geodesic construction. Geodesic structural elements may include stringers wound about formers (which may be alternatively called station frames) in opposing spiral directions. A "stringer," for the purposes of this disclosure is a general structural element that includes a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 100. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 100 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 1, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 1, according to some embodiments, a fuselage may include a semi-monocoque construction. Semi-monocoque construction, as used in this disclosure, is used interchangeably with partially monocoque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which are may be used in real-world manufacturing for weight savings and for routing of electrical harnesses and other modern onboard systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 1, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 1, in some embodiments, another common structural form is sandwich structure. As used in this disclosure, "sandwich structure" includes a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 1, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 104. In some cases, monocoque may be considered to include substantially only structural skin, and in that sense, aircraft skin undergoes stress by applied aerodynamic fluids imparted by fluid. Stress as used in continuum mechanics can be described in pound-force per square inch ($lbf/in^2$) or Pascals (Pa). In semi-monocoque construction stressed skin bears part of aerodynamic loads and additionally imparts force on an underlying structure of stringers and formers.

With continued reference to FIG. 1, a fuselage may include an interior cavity. An interior cavity may include a volumetric space configurable to house passenger seats and/or cargo. An interior cavity may be configured to include receptacles for fuel stores, batteries, fuel cells, or other energy sources as described herein. In some cases, a post may be supporting a floor (i.e., deck), or in other words a surface on which a passenger, operator, passenger, payload, or other object would rest on due to gravity when within an aircraft 100 is in its level flight orientation or sitting on ground. A post may act similarly to stringer in that it is configured to support axial loads in compression due to a load being applied parallel to its axis due to, for example, a heavy object being placed on a floor of aircraft 100. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 1, aircraft 100 may include at least a flight component 108. A flight component 108 may be consistent with any description of a flight component described in this disclosure, such as without limitation propulsors, control surfaces, rotors, engines, propellers, wings, winglets, or the like. For the purposes of this disclosure, at least a "flight component" is at least one element of an aircraft 100 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 100. In some embodiments, at least a flight component 108 may include a propulsor, for example a rotor attached to an electric motor configured to produce shaft torque and in turn, create thrust. As used in this disclosure, an "electric motor" is an electrical machine that converts electric energy into mechanical work.

Still referring to FIG. 1, in some embodiments, a flight component may include an engine. As used herein, an "engine" is a machine designed to convert one or more non-mechanical forms of energy into mechanical energy. Engine may include an engine assembly. An "engine assembly," as used herein, is a mechanical assembly including all of the constituent parts of an engine. Engine assembly may include, as non-limiting examples, a fan, gearbox such as a reduction gearbox, an engine core, and/or the like. An engine may include embodiments as described in U.S. Non-provisional application Ser. No. 17/501,492 filed on Oct. 14, 2021, and entitled "DRAG RECOVERY SCHEME USING BOUNDARY LAYER INGESTION," and U.S. Non-provisional application Ser. No. 18/102,342 filed on Jan. 27, 2023, and entitled "APPARATUS FOR INGESTING BOUNDARY LAYER FLOW FOR AN AIRCRAFT," the entirety of both of which are incorporated herein by reference. In some embodiments, an engine may include a turbine. As used herein, a "turbine" is a machine which propels an aircraft through use of a rotor affixed to one or more vanes. In some embodiments, an engine, such as a turbine, may be configured to propel aircraft 100 forward while aircraft 100 is airborne.

Still referring to FIG. 1, in some embodiments, an engine may be positioned in order to avoid damage to other critical components of aircraft 100 in the event of engine failure. In some embodiments, engine may be positioned towards the rear of aircraft 100. In some embodiments, engine may be positioned on top of main body of aircraft 100. In some embodiments, aircraft 100 may include multiple engines, each of which is positioned towards rear of aircraft 100 and/or on top of main body of aircraft 100.

Still referring to FIG. 1, in some embodiments, engine may be mounted aft of rear spar and/or rear pressure bulkhead. In some embodiments, such positioning may result in reduced likelihood that engine failure results in puncture of the pressure vessel. In some embodiments, fuel stores may be located forward of and/or below engine. In some embodiments, such positioning may allow fuel store to avoid debris from engine failure. In some embodiments, such positioning may leave only top of fuel store within a potential debris field. This may limit fuel loss by reducing the likelihood that debris punctures bottom of fuel store which may create a leak. In some embodiments, aircraft 100 may include a plurality of fuel stores such that damage to a single fuel store may not compromise fuel in other fuel stores. In some embodiments, a turbine may be placed using the same considerations laid out herein with respect to engine placement. This may limit the likelihood of, for example, a turbine blade from piercing pressure vessel upon turbine failure.

Still referring to FIG. 1, as used herein, a "lateral" direction of an aircraft is a direction running in a straight line from wing tip to wing tip. Lateral direction may be orthogonal to longitudinal direction. As used herein, a "longitudinal" direction of an aircraft is a direction running in a straight line from nose to tail of the aircraft. As used herein, "fore" and "forward" are used interchangeably to mean a direction from an aircraft tail to an aircraft nose along a longitudinal axis. As used herein, "aft" and "rear" are used interchangeably to mean a direction from an aircraft nose to an aircraft tail along a longitudinal axis.

Still referring to FIG. 1, where it is said that a first component is in a direction of a second component herein, this means that the first component is located in that direction of a plane perpendicular to a line in the specified direction. Unless specified otherwise, where it is said that a first component is in a direction of a second component herein, this means that the entirety of the first component is in the specified direction relative to the entirety of the second component. For example, if it is said that an engine is above a fuel store, then, unless specified otherwise, the entirety of the engine is above the entirety of the fuel store along a vertical axis, but this does not mean or imply any relationship between the engine or the fuel store along a horizontal axis.

Still referring to FIG. 1, where a first component is not completely in a direction of another (i.e., where there is overlap in their ranges on the relevant axis), the degree to which a component is in a direction of another is measured by, unless specified otherwise, volume. For example, if 50% of an engine is said to be aft of 70% of a pressure vessel, then, unless specified otherwise, that means 50% of the volume of the engine is aft of 70% of the volume of the pressure vessel.

Still referring to FIG. 1, in some embodiments, engine may be positioned aft of rear pressure bulkhead. In some embodiments, at least 10%, 20%, 30%, 40%, 50%, 60%, 70%, 80%, 90%, or 100% of engine may be positioned aft of rear pressure bulkhead. In some embodiments, the entirety of each engine of aircraft 100 may be positioned aft of rear pressure bulkhead. In some embodiments, at least 10%, 20%, 30%, 40%, 50%, 60%, 70%, 80%, 90%, or 100% of each engine of aircraft 100 may be positioned aft of rear pressure bulkhead.

Still referring to FIG. 1, in some embodiments, engine may be positioned aft of pressure vessel. In some embodiments, at least 10%, 20%, 30%, 40%, 50%, 60%, 70%, 80%, 90%, or 100% of engine may be positioned aft of pressure vessel. In some embodiments, the entirety of each engine of aircraft 100 may be positioned aft of pressure vessel. In some embodiments, at least 10%, 20%, 30%, 40%, 50%, 60%, 70%, 80%, 90%, or 100% of each engine of aircraft 100 may be positioned aft of pressure vessel. In some embodiments, at least 10%, 20%, 30%, 40%, 50%, 60%, 70%, 80%, 90%, or 100% of engine may be positioned aft of at least 10%, 20%, 30%, 40%, 50%, 60%, 70%, 80%, 90%, or 100% of pressure vessel.

Still referring to FIG. 1, in some embodiments, engine may be positioned aft of rear spar. In some embodiments, at least 10%, 20%, 30%, 40%, 50%, 60%, 70%, 80%, 90%, or 100% of engine may be positioned aft of rear spar. In some embodiments, the entirety of each engine of aircraft 100 may be positioned aft of rear spar. In some embodiments, at least 10%, 20%, 30%, 40%, 50%, 60%, 70%, 80%, 90%, or 100% of each engine of aircraft 100 may be positioned aft of rear spar.

Still referring to FIG. 1, in some embodiments, engine may be positioned aft of fuel store. In some embodiments, at least 10%, 20%, 30%, 40%, 50%, 60%, 70%, 80%, 90%, or 100% of engine may be positioned aft of fuel store. In some embodiments, the entirety of each engine of aircraft 100 may be positioned aft of fuel store. In some embodiments, at least 10%, 20%, 30%, 40%, 50%, 60%, 70%, 80%, 90%, or 100% of each engine of aircraft 100 may be positioned aft of fuel store. In some embodiments, at least 10%, 20%, 30%, 40%, 50%, 60%, 70%, 80%, 90%, or 100% of engine may be positioned aft of at least 10%, 20%, 30%, 40%, 50%, 60%, 70%, 80%, 90%, or 100% of fuel store. In some embodiments, at least 10%, 20%, 30%, 40%, 50%, 60%, 70%, 80%, 90%, or 100% of fuel is stored aft of engine.

Still referring to FIG. 1, in some embodiments, engine may be positioned above fuel store. In some embodiments, at least 10%, 20%, 30%, 40%, 50%, 60%, 70%, 80%, 90%, or 100% of engine may be positioned above fuel store. In some embodiments, the entirety of each engine of aircraft 100 may be positioned above fuel store. In some embodiments, at least 10%, 20%, 30%, 40%, 50%, 60%, 70%, 80%, 90%, or 100% of each engine of aircraft 100 may be positioned above fuel store. In some embodiments, at least 10%, 20%, 30%, 40%, 50%, 60%, 70%, 80%, 90%, or 100% of engine may be positioned above at least 10%, 20%, 30%, 40%, 50%, 60%, 70%, 80%, 90%, or 100% of fuel store. In some embodiments, at least 10%, 20%, 30%, 40%, 50%, 60%, 70%, 80%, 90%, or 100% of fuel is stored below engine.

With continued reference to FIG. 1, for the purposes of this disclosure, "torque", is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 1, at least a flight component may be one or more devices configured to affect aircraft's 100 attitude. "Attitude", for the purposes of this disclosure, is the relative orientation of a body, in this case aircraft 100, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 100. A plurality of attitude datums may indicate one or more measurements relative to an aircraft's pitch, roll, yaw, or throttle compared to a relative starting point. One or more sensors may measure or detect an aircraft's 100 attitude and establish one or more attitude datums. An "attitude datum", for the purposes of this disclosure, refers to at least an element of data identifying an attitude of an aircraft 100.

With continued reference to FIG. 1, in some cases, aircraft 100 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 1, in some cases, aircraft 100 may include at least a pilot control. As used in this disclosure, a "pilot control," is an interface device that allows an operator, human or machine, to control a flight component of an aircraft. Pilot control may be communicatively connected to any other component presented in aircraft 100, the communicative connection may include redundant connections configured to safeguard against single-point failure. In some cases, a plurality of attitude datums may indicate a pilot's instruction to change heading and/or trim of an aircraft 100. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch", for the purposes of this disclosure refers to an aircraft's angle of attack, that is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, as in a banking maneuver. "Yaw", for the purposes of this disclosure, refers to an aircraft's turn angle, when an aircraft rotates about an imaginary vertical axis intersecting center of earth and aircraft 100. "Throttle", for the purposes of this disclosure, refers to an aircraft outputting an amount of thrust from a propulsor. In context of a pilot input, throttle may refer to a pilot's input to increase or decrease thrust produced by at least a propulsor. Flight components 108 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may determine as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 1, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 108. At least a flight component 108 may include any propulsor as described herein. In embodiment, at least a flight component 108 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 1, at least a sensor may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat", for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 1, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 1, at least a flight component 108 may include wings, empennages, nacelles, control surfaces, fuselages, and landing gear, among others, to name a few. In embodiments, an empennage may be disposed at the aftmost point of an aircraft body 104. Empennage may comprise a tail of aircraft 100, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 100 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 100 symmetrically, at a point between nose and empennage. Wings may comprise a plurality of geometries in planform view, swept swing, tapered, variable wing, triangular, oblong, elliptical, square, among others. Wings may be blended into the body of the aircraft such as in a BWB 104 aircraft 100 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 108 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

With continued reference to FIG. 1, in some cases, flight component 108 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 100. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

With continued reference to FIG. 1, wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise be wasted energy in a wingtip vortex to an apparent thrust. This small contribution can be worthwhile over the aircraft's lifetime. Another potential benefit of winglets is that they may reduce the intensity of wake vortices. Wake vortices may trail behind an aircraft 100 and pose a hazard to other aircraft. Minimum spacing requirements between aircraft at airports are largely dictated by hazards, like those from wake vortices. Aircraft are classified by weight (e.g., "Light," "Heavy," and the like) often based upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 1, aircraft 100 may include an energy source. Energy source may include any device providing energy to at least a flight component 108, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 1, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels., synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 104 of aircraft 100, for example without limitation within a wing portion of blended wing body. Aviation fuels may include petroleum-based fuels, or petroleum and synthetic fuel blends, used to power aircraft 100. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 100. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

Still referring to FIG. 1, in some embodiments, aircraft 100 may include a fuel store and fuel store may be positioned in a transition portion of blended wing body between the main body and a wing. In some embodiments, a first fuel store is positioned in a transition portion of blended wing body between main body and port wing, and a second fuel store is positioned in a transition portion of blended wing body between main body and starboard wing.

With continued reference to FIG. 1, modular aircraft 100 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 1, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

With continued reference to FIG. 1, fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 1, fuel cell may necessitate storage of fuel, such as liquified gas.

With continued reference to FIG. 1, aircraft 100 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 1, aircraft 100 may include multiple flight component 108 sub-systems, each of which may have a separate energy source. For instance, and without limitation, one or more flight components 108 may have a dedicated energy source. Alternatively, or additionally, a plurality of energy sources may each provide power to two or more flight components 108, such as, without limitation, a "fore" energy source providing power to flight components located toward a front of an aircraft 100, while an "aft" energy source provides power to flight components located toward a rear of the aircraft 100. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 1, aircraft 100 may include a flight component 108 that includes at least a nacelle. For the purposes of this disclosure, a "nacelle" is a streamlined body housing, which is sized according to that which it houses, such as without limitation an engine, a fuel store, or a flight component. When attached by a pylon entirely outside an airframe a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 100 partially or wholly enveloped by an outer mold line of the aircraft 100. At least a nacelle may be designed to be streamlined. At least a nacelle may be asymmetrical about a plane comprising the longitudinal axis of the engine and the yaw axis of modular aircraft 100.

With continued reference to FIG. 1, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 1, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that May be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 1, in nonlimiting embodiments, at least a flight component 108 may include an airbreathing engine such as a jet engine, turbojet engine, turboshaft engine, ramjet engine, scramjet engine, hybrid propulsion system, turbofan engine, or the like. At least a flight component 108 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 1, an aircraft 100 may include a flight controller. As used in this disclosure, a "flight controller" is a device that generates signals for controlling at least a flight component 108 of an aircraft 100. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 1, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, aircraft 100 may include landing gear such as tilting landing gear and/or cabin stowed landing gear. Landing gear may be consistent with any landing gear disclosed in U.S. patent application Ser. No. 17/868,483, filed on Jul. 19, 2022, and titled "TILTING LANDING GEAR SYSTEMS AND METHODS," U.S. patent application Ser. No. 16/730,108, filed on Dec. 30, 2019, and titled "SWING-ARM PIVOT PISTON LANDING GEAR SYSTEMS AND METHODS," U.S. patent application Ser. No. 17/873,865, filed on Jul. 26, 2022, and titled "TILTING LANDING GEAR SYSTEMS AND METHODS," U.S. patent application Ser. No. 17/958, 724, filed on Oct. 3, 2022, and titled "AN AIRCRAFT WITH CABIN-STOWED LANDING GEAR," the entirety of each of which is hereby incorporated by reference. In some embodiments, aircraft 100 may include an engine support structure. An engine support structure may be consistent with any structure disclosed in U.S. patent application Ser. No. 18/243,859, filed on Sep. 8, 2023, and titled "AN AIRCRAFT WITH AN ENGINE SUPPORT STRUC-TURE," the entirety of which is hereby incorporated by reference. In some embodiments, aircraft 100 may include a long range tanker. Such an aircraft may be consistent with any aircraft disclosed in U.S. patent application Ser. No. 18/243,207, filed on Sep. 7, 2023, and titled "TANKER AIRCRAFT FOR LONG-DISTANCE TRAVEL," the entirety of which is hereby incorporated by reference. In some embodiments, aircraft 100 may include a multiwalled fuel tank. A multiwalled fuel tank may be consistent with any fuel tank disclosed in U.S. patent application Ser. No. 18/200,668, filed on May 23, 2023, and titled "AIRCRAFT WITH A MULTI-WALLED FUEL TANK AND A METHOD OF MANUFACTURING," the entirety of which is hereby incorporated by reference. In some embodiments, aircraft 100 may include a fuel tank stored aft of a main cabin. Such a fuel tank and/or aircraft configuration may be consistent with any fuel tank and/or aircraft configuration disclosed in U.S. patent application Ser. No. 17/731,728, filed on Apr. 28, 2022, and titled "AN AIRCRAFT WITH FUEL TANKS STORED AFT OF A CABIN IN A MAIN BODY AND A METHOD FOR MANUFACTURING," the entirety of which is hereby incorporated by reference.

Figure 2:
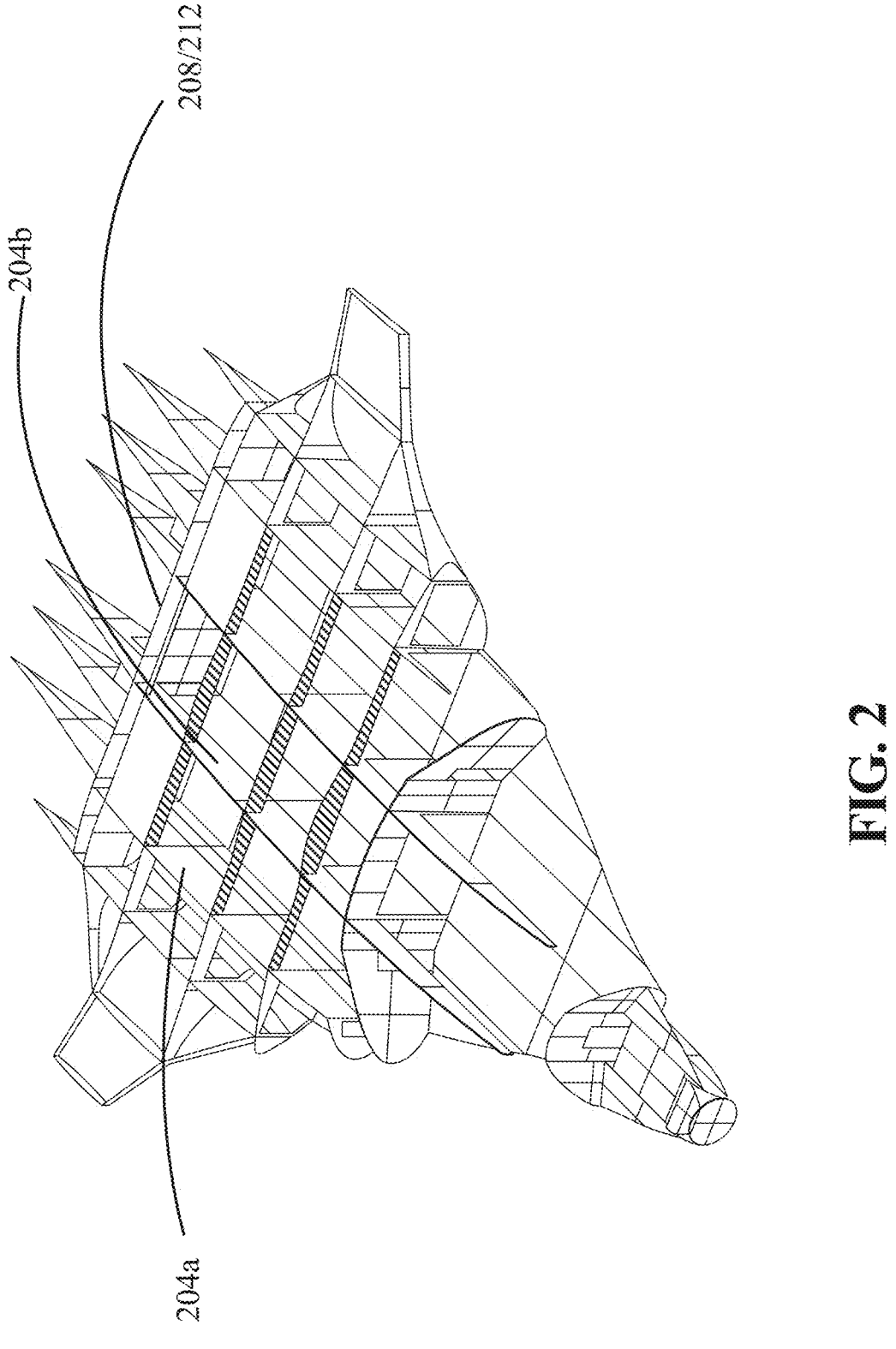
FIG. 2 is an illustration of exemplary embodiments of structural components of an aircraft.

Now referring to FIG. 2, fuselage 112 may include a plurality of ribs. As used herein, a "rib" is a structural member that runs longitudinally down a fuselage. In some embodiments, a rib may be the forming element of the structure of a wing. Ribs of aircraft may include form-ribs, plate type ribs, closed-ribs, forged ribs, milled ribs, and the like. Ribs may be made of made out of wood, metal, plastic, composites, foam, and the like. A plurality of ribs may include a first rib 204a and a second rib 204b. Additionally, fuselage 112 may include one or more spars. A "spar," as used herein, is structural member of an aircraft that is transverse to longitudinal structural members. Spars may support flight loads and the weight of the wings while on the ground. Spars may be made of metal, wood, composite materials, and the like. Spars may run perpendicular to the ribs. First rib 204a and second rib 204b may be attached to a rear-most spar 208 of the one or more spars. A "rear spar," as used herein, is the aft most spar of an aircraft. In some embodiments, a rear spar 208 may include a rear spar of an aircraft centerbody. In some embodiments, a rear spar 208 may exclude a rear spar of a wing and/or winglet.

Still referring to FIG. 2, in some embodiments, engine may be mounted behind a pressure vessel of fuselage 112. As used herein, a "pressure vessel" is a closed container, compartment, storage, or vessel that is designed to withstand pressures higher or lower than the surrounding atmosphere. For example, at higher altitudes an interior of the main body of aircraft 100 may contain a large pressure difference in comparison to the atmospheric pressure such that the main body of aircraft 100 is a pressure vessel. In some embodiments, engines may be mounted to ribs of the aircraft attached to aft face of aft pressure bulkhead 212; the opened ended structure may allow easier mounting of an engine. As used herein, "rear pressure bulkhead" and "aft pressure bulkhead" are used interchangeably to mean a rear pressure containing component of an airframe. In some embodiments, a rear pressure bulkhead may include the rearmost pressure sealing element of a pressure vessel. In some embodiments, rear pressure bulkhead may include a rear-most rib. In some embodiments, rear pressure bulkhead may include a rear-most frame. In some embodiments, the two outer most (laterally) spars may include pressure bulkheads configured to resist a pressure loading resulting from low ambient pressure and the like. In some embodiments, pressure vessel may include a passenger compartment.

Figure 3:
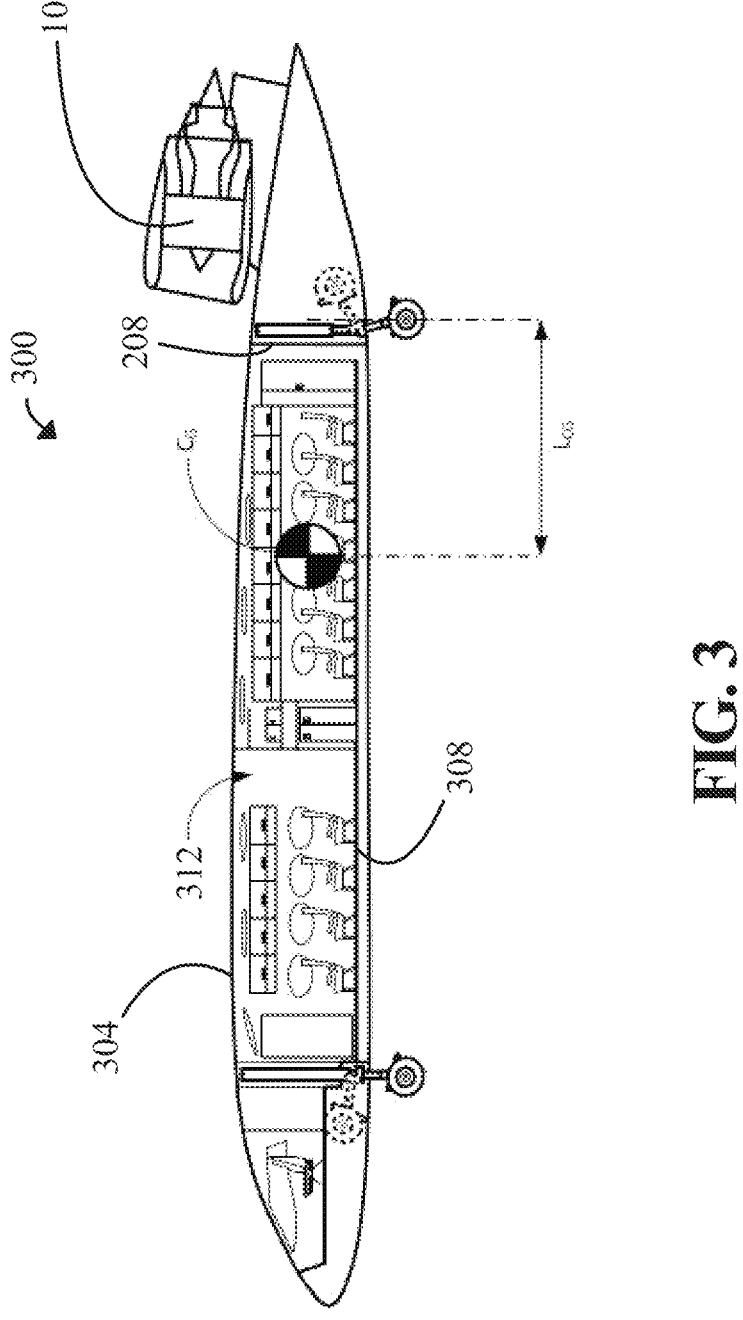
FIG. 3 is a side view illustration of an exemplary aircraft.

Referring now to FIG. 3, an exemplary aircraft 300 is illustrated in side-view. Aircraft 300 may include a blended wing body 304. Aircraft 300 may include a single deck 308. In some embodiments, blended wing body 304 and or fuselage, as described above, may include single deck 308. Single deck 308 may include a passenger compartment 312.

With continued reference to FIG. 3, as used in this disclosure, a "deck" on an aircraft is platform upon which one or more of passengers and cargo may be stored. A single deck 308 may be contrasted with a two-deck configuration analogously to a single-story house contrasted to a two-story house. In some cases, a single deck may have deviations in angle or height, just as a single-story house may have rooms in which one steps-up or steps-down in when entering. For example, in some cases, a single deck 308 may include multiple bays (e.g., 2 bays, 3 bays, 4 bays, 5 bays, and the like). Each of the multiple bays may have a floor which is not in plane with another bay. Furthermore, in some cases, a single deck 308 may not be entirely of a single plane or angle. For example, single deck 308 may have slight grade introduced in one or more portions. Slight grade in single deck 308 may match or parallel an outer mold line of aircraft. While a single deck 308 need not be comprised of a single plane, a single deck 308 may be characterized by its not having another deck directly above or below it. A plane coincident with single deck 308 may be conceptualized as a horizontal line, coincident with the single deck 308, extending across FIG. 3.

Figure 4:
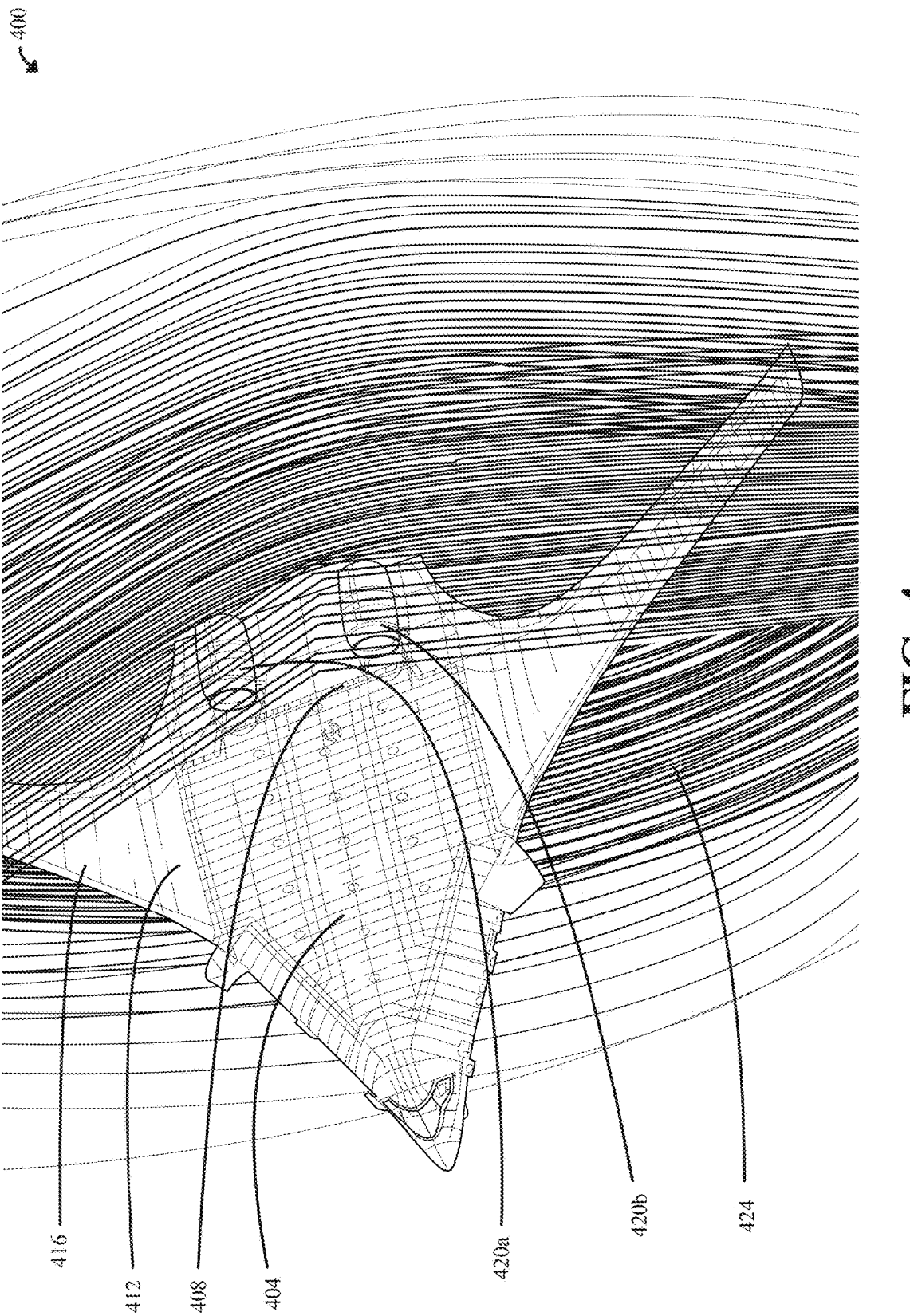
FIG. 4 is a forward, port and top view of an exemplary blended wing body aircraft and an exemplary engine rotor burst zone.

Now referring to FIG. 4, an exemplary embodiment of aircraft 400 and an engine rotor burst zone are disclosed. As used herein, a "rotor burst zone" is a region of elevated risk of damage due to debris associated with engine failure. Such debris may include, in non-limiting examples, a component of a rotor, or a component of another part of an engine. In some embodiments, rotor burst zones may be calculated for a particular engine design based on the features of that engine. Aircraft 400 may include pressure vessel 404, which may include rear pressure bulkhead 408. Aircraft 400 may also include fuel store 412, which may be in a transition region between main body of aircraft 400 and wing 416. Aircraft 400 may also include first engine 420a. Aircraft 400 may also include second engine 420b. In some embodiments, first engine 420a and/or second engine 420b may be positioned aft of rear pressure bulkhead 408, aft of fuel store 412 and/or above fuel store 412. Such positioning may cause the most high risk parts of rotor burst zone 424 not to include pressure vessel 404 and/or fuel store 412.

Still referring to FIG. 4, in some embodiments, a rotor burst zone may be described or approximated as a plane extending from engines in lateral and vertical directions. In some embodiments, a rotor burst zone may be described or approximated as the region outside of a right circular cone, with the vertex of the cone positioned at an engine and the center of the base of the cone forward of the vertex of the cone, and where the angle between the outside of the cone and the altitude line is about 10, 20, 30, 40, 50, 60, 70, 75, 80, or 85 degrees. A vertex of a conical rotor burst zone may be positioned for example at front, back or midpoint of engine or at the location of fan blades. A vertex of a conical rotor burst zone may be positioned at an opening of an engine, such as an inlet or outlet. In some embodiments, aircraft components may be positioned in order to account for multiple rotor burst zones which may account for multiple engines. Pressure vessel, fuel stores, and engines may be positioned such that pressure vessel and/or fuel stores avoid all or any subset of rotor burst zones (for example, a component may be outside of multiple rotor burst zones in the case of an aircraft design with multiple engines). For example, pressure vessel may be 10%, 20%, 30%, 40%, 50%, 60%, 70%, 80%, 90%, or 100% outside of a rotor burst zone. In another example, a fuel store may be 10%, 20%, 30%, 40%, 50%, 60%, 70%, 80%, 90%, or 100% outside of a rotor burst zone. In another example, the bottom of a fuel store may be 10%, 20%, 30%, 40%, 50%, 60%, 70%, 80%, 90%, or 100% outside of a rotor burst zone.

Still referring to FIG. 4, in some embodiments, one or more components of an aircraft, such as a pressure vessel and/or a fuel store, may be positioned within a rotor burst exclusion cone. As used herein, a "rotor burst exclusion cone" is a right circular cone, with the vertex of the cone positioned at the geometric center of a rotor of an engine and the center of the base of the cone forward of the vertex of the cone, and where the angle between the outside of the cone and the altitude line is equal to the forward most angle of a debris field resulting from engine failure. The angle between the outside of the cone and the altitude line of a rotor burst exclusion cone may depend on particular engine used. In some embodiments, a component such as a pressure vessel or fuel store may be 10%, 20%, 30%, 40%, 50%, 60%, 70%, 80%, 90%, or 100% inside a rotor burst exclusion cone.

Still referring to FIG. 4, in some embodiments, a rotor burst zone may include regions of relatively high, moderate, and low risk. In some embodiments, positions aft of or lateral to engines and/or turbines are relatively high risk. In some embodiments, positions outside of a conical exclusion from rotor burst zone (as described above) but not aft of or lateral to engines are moderate risk. In some embodiments, positions in a conical exclusion from a rotor burst zone as described above are relatively low risk. In some embodiments, a pressure vessel may be in a low and/or moderate risk zone of a rotor burst zone. In some embodiments, 10%, 20%, 30%, 40%, 50%, 60%, 70%, 80%, 90%, or 100% of a pressure vessel is in a low and/or moderate risk zone of a rotor burst zone. In some embodiments, a fuel store may be in a low and/or moderate risk zone of a rotor burst zone. In some embodiments, 10%, 20%, 30%, 40%, 50%, 60%, 70%, 80%, 90%, or 100% of a fuel store is in a low and/or moderate risk zone of a rotor burst zone. In some embodiments, 10%, 20%, 30%, 40%, 50%, 60%, 70%, 80%, 90%, or 100% of fuel is stored in fuel stores in a low and/or moderate risk zone of a rotor burst zone. In some embodiments, a bottom of a fuel store is in a low and/or moderate risk zone of a rotor burst zone.

Still referring to FIG. 4, a rotor burst zone may be described for one or more components of an engine. In some embodiments, a turbofan engine may include two major rotating assemblies: a fan and a core. A fan may be located near the front of a propulsion system. A fan may function as a large, ducted propeller that provides engine thrust. A core may include a gas turbine engine that converts fuel to rotary motion to drive a fan. In some embodiments, a fan may fail in such a way that fan blades or groups of fan blades break off from a fan hub, penetrate an engine nacelle and fly outward, potentially and unfavorably damaging the airplane. These failed components may fly outward over a range of forward or aft of a plane that is perpendicular to the engine's rotational axis. In some embodiments, a potential region of damage is limited by two cones, one forming a forward limit and one forming an aft limit. The apex of these two cones may be determined by setting such cones to just touch forward and aft intact fan blade surfaces. In some embodiments, such two apexes are not collocated. An engine core may include a compressor, combustor, and turbine. A compressor may be divided into multiple sections that may spin at different speeds. For example, there may be a larger and lower speed low pressure compressor and a smaller and faster high pressure compressor. An engine may include a fast-spinning high pressure turbine and a slower-spinning low pressure turbine. Low-pressure turbine may be behind the high-pressure turbine. High pressure turbine and low pressure turbine are described in the context of FIG. 7 below. In some embodiments, the entirety of a pressure vessel is outside of a rotor burst zone of the high pressure turbine. In some embodiments, the entirety of one or more fuel stores is outside of the rotor burst zone of a high pressure turbine. In some embodiments, a high pressure turbine is positioned aft of the entirety of a rear pressure bulkhead of the pressure vessel. In some embodiments, high-pressure turbine may be more likely to fail than low-pressure turbine. In some embodiments, this may be a result of high pressure turbine's operation in very high temperature flows immediately downstream of a combustor in combination with high rotational speed. High temperature may weaken turbine structure while high rotational speed may impose high structural loads. High pressure turbine may break into segments with high kinetic energy. A rotor burst zone may be specific to such segments. In some embodiments, a rotor burst zone may include one or both of forward and aft cone surfaces that are axially symmetric about an engine rotational axis. A forward cone may extend outward and forward, and an aft cone may extend outward and aft. A location of a forward cone may be such that it just encompasses the forward portion of a high-speed turbine. Likewise, an aft cone may just encompass the aft portion of a high-speed turbine.

Figure 5:
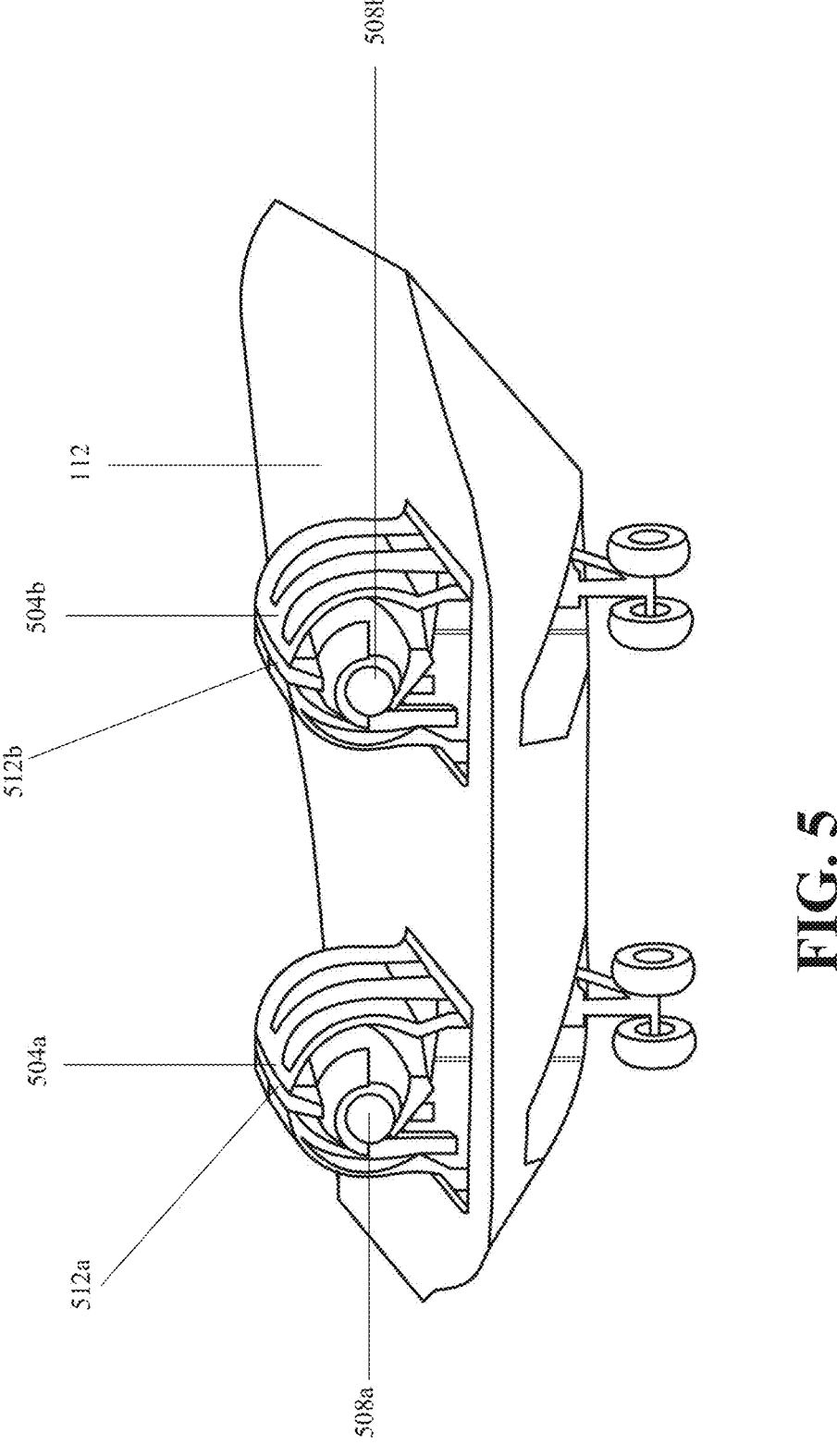
FIG. 5 is an illustration of a fuselage of an aircraft with an engine support structure.

Referring now to FIG. 5, an exemplary embodiment of fuselage 112 of an aircraft, being any as described throughout this disclosure, with an engine support structure 504 is illustrated. In some embodiments, engine support structure 504 may be mounted on top of fuselage 112. In some embodiments, engine support structure 504 may be mounted to a top surface of fuselage 112. In some embodiments, engine support structure 504 may be mounted on top of the main body of aircraft 100. An "engine support structure," as used herein, is a structure that connects an engine with the main body or frame of the aircraft. It may serve various purposes, like connecting the engine with the fuselage 112, suppressing the vibrations of the engine and distributing them safely to the whole aircraft structure for a smooth flight. An engine support structure 504 may be a precision-based metal structure that is highly sturdy, as it has to balance the weight of the engine during different torque requirements. Engine support structure 504 may be constructed of any suitable material or combination of materials, including without limitation metal such as aluminum, titanium, or the like, polymer materials or composites, fiberglass, carbon fiber, or any other suitable material. As a non-limiting example, engine support structure 504 may be constructed from additively manufactured polymer material with a carbon fiber exterior; aluminum parts or other elements may be enclosed for structural strength, or for purposes of supporting, for instance, vibration, torque or shear stresses imposed by at least a propulsor. Engine support structure 504 may include a plurality of hoop structures, wherein each hoop structure of the plurality of hoop structures may include a horseshoe structure located forward of the center of gravity to the at least engine 508a-b. Engine support structure 504 may include a plurality of hoop structures, wherein each hoop structure of the plurality of hoop structures may include a horseshoe structure located forward of the center of gravity of the at least an engine assembly. A "hoop structure," as used herein, is an engine support structure that at least partially wraps around an engine of an aircraft. In some embodiments, a hoop structure may include a horseshoe structure. A "horseshoe structure," as used herein, is an arc-shaped engine support structure. Engine 508a-b is configured to be top mounted to aircraft. For the purposes of this disclosure, an engine is "top mounted" when the engine is connected to an aircraft through a connection on top of the engine. Additionally engines as described herein, may be mounted in way that support comes from the bottom of the engine support structure 504. In some embodiments, aircraft may include one or more engines, such as a first and second engine mounted or top mounted to aircraft. Engines may include a turbojet, turboprop, turbofan, ramjet, pulsejet, scramjet, electrical engine, and the like. In some embodiments, engines may be powered using fuel such as Jet A, Jet A1, Aviation gasoline (AVGAS), TS-1, Jet B, JP-8, JP-5, and the like.

Still referring to FIG. 5, fuselage 112 may include a plurality of ribs. In some embodiments, a rib may be the forming element of the structure of a wing. Ribs of aircraft may include form-ribs, plate type ribs, closed-ribs, forged ribs, milled ribs, and the like. Ribs may be made of made out of wood, metal, plastic, composites, foam, and the like. Additionally, fuselage 112 may include one or more spars. Spars may support flight loads and the weight of the wings while on the ground. Spars may be made of metal, wood, composite materials, and the like. Spars may run perpendicular to the ribs. A rib may be attached to a rear-most spar of the one or more spars.

Still referring to FIG. 5, the plurality of hoop structures of engine support structure 504 may resemble a horseshoe and may be used to provide a vertical engine mount for engines mounted atop a blended wing body aircraft. A "vertical engine mount," a used herein, is a device configured to vertically restrain the position of an engine. An engine mount may include a rubber body, sleeve bushing, a bonded plate, a connection bolt, and the like. An engine mount may be made of steel chrome molybdenum, chromoly tubular steel, and the like. An engine mount may include a conical engine mount, dynafocal engine mount, bed mount, and the like. This may be in contrast to banjos fittings that have been conventionally used. In some embodiments, aircraft may include first engine support structure 504a attached to a first engine 508 and a second engine support structure 504b attached to a second engine 508b as described above.

With continued reference to FIG. 5, engine support structure 504a-b may include a beam 512a-b. In some embodiments, beam 512a-b may be part of a horseshoe structure. In some embodiments, horseshoe structure may include a first half and a second half, wherein the first half and the second half are connected by beam 512a-b. In some embodiments, top of engine 508a-b may be attached beam 512a-b of engine support structure 504a-b. In some embodiments, engine 508a-b may suspended from beam 512a-b of engine support structure 504a-b. In some embodiments, top of engine 508a-b may be attached to engine support structure 504a-b. In some embodiments, engine 508a-b may suspended from engine support structure 504a-b. In some embodiments, engine support structure 504 may be mounted onto one or more wings of aircraft 100.

Still referring to FIG. 5, a plurality of hoop structures may include two to three horseshoe structures; for example, with the left side of the horseshoe structures mounted to a first rib and the right side of the horseshoe structures mounted to a second rib. In an embodiments with two horseshoe structures, a first rib and second rib may be aft of and mounted to a rear spar, which may be used as a major structural element, and may allow for the addition of a thrust reverser to aircraft, as the design may provide a more open-ended structure. Each of the two horseshoe structures may be located forward of the center of gravity (CG) of engine 508. Each of the two horseshoe structures may be located forward of the center of gravity (CG) of engine assembly. In an embodiment with three horseshoe structures, the third horseshoe structure may be located aft of the CG of the engine. In an embodiment with three horseshoe structures, the third horseshoe structure may be located aft of the CG of the engine assembly. Forward placement of the horseshoe structures relative to the CG of the engine and/or engine assembly may allow for a thrust reversal mechanism, also referred to as reverse thrust. "Thrust reversal," as used herein, is the temporary diversion of an aircraft engine's thrust for it to act against the forward travel of the aircraft, providing deceleration. A thrust reversal mechanism may help slow down a jet aircraft just after touch-down, reducing wear on the brakes and enabling shorter landing distances. Aircraft 100 may include target-type thrust reversal mechanism, wherein a pair of hydraulically operated bucket or clamshell type doors are used to reverse the hot gas stream. For forward thrust, these doors form the propelling nozzle of the engine. Aircraft 100 may include an internal thrust reversal mechanism, wherein deflector doors inside the engine shroud to redirect airflow through openings in the side of the nacelle. In a jet aircraft embodiment, a thrust reversal mechanism may be accomplished by causing the jet blast to flow forward. In some embodiments, the engine does not run or rotate in reverse; instead, thrust reversing devices are used to block the blast and redirect it forward. Thrust reversing devices may include a bucket type reverser, clamshell door reverser cold, stream reverser cold stream, pivoting doors reverser, and the like.

With continued reference to FIG. 5, the plurality of hoop structures may be coupled together by a shear support structure. A "shear support structure," for the purposes of this disclosure, is a structure that links one or more hoop structures in shear. In some embodiments, shear support structure may be in the shape of a shell. In some embodiments, shear support structure may transmit engine thrust from one or more hoop structures to the airframe. In some cases, it may be disadvantageous to provide openings in the shear support structure to permit the redirected airflow from a thrust reversal mechanism. Accordingly, in some embodiments, it is advantageous for hoop structures and shear support structure to be located ahead of a thrust reversal mechanism. Accordingly, placement of two hoop structures forward of an engine CG and/or engine assembly CG may allow for the inclusion of a thrust reversal mechanism. In some embodiments, use of two hoop structures with the aft-most hoop structure located lightly aft of the CG of the fan core of the engine. This may allow for the thrust reversal mechanism to be placed aft of the shear support structure.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Figure 6:
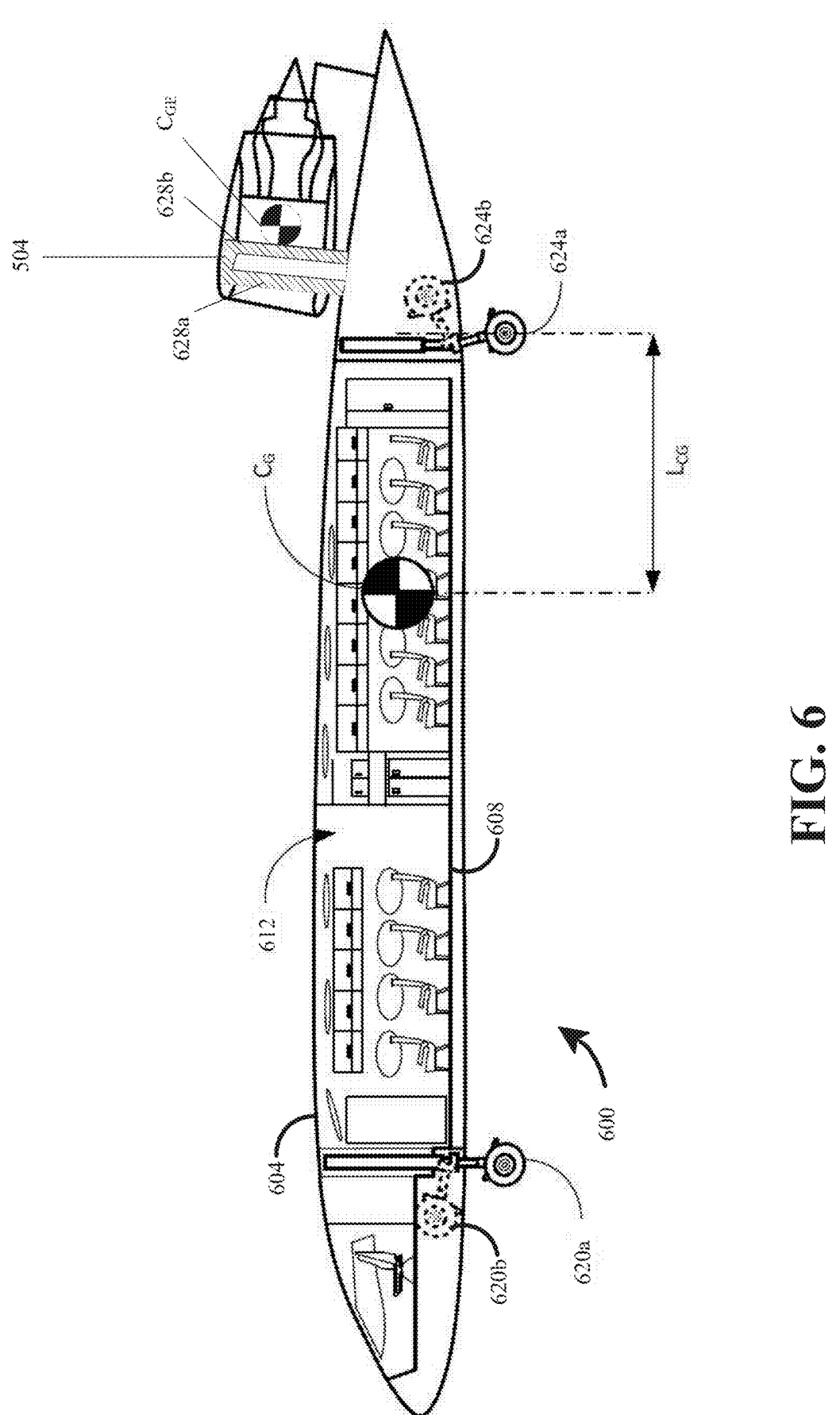
FIG. 6 is a side view illustration of an exemplary aircraft.

Referring now to FIG. 6, an exemplary aircraft 600 is illustrated in side-view. Aircraft 600 may include a blended wing body 604. Aircraft 600 may include a single deck 608. In some embodiments, blended wing body 604 and or fuselage, as described above, may include single deck 608. Single deck 608 may include a passenger compartment 612. As can be seen in FIG. 6, in some cases, nose gear 620*a-b* may be located substantially forward of single deck 608; and/or main gear 624*a-b* may be location substantially aft of the single deck 608. In some cases, passenger compartment 612 may be located substantially between nose gear 620*a-b* and main gear 624*a-b*. FIG. 6 shows nose gear 620*a-b* in an extended position 620*a* as well as a retracted position 620*b*. FIG. 6 also shows main gear 624*a-b* in an extended position 624*a* as well as a retracted position 624*b*. As described above, in some cases, when retracted, one or more of nose gear 620*a-b* and main gear 624*a-b* may be located within a gear housing.

With continued reference to FIG. 6, as used in this disclosure, a "deck" on an aircraft is platform upon which one or more of passengers and cargo may be stored. A single deck 608 may be contrasted with a two-deck configuration analogously to a single-story house contrasted to a two-story house. In some cases, a single deck may have deviations in angle or height, just as a single-story house may have rooms in which one steps-up or steps-down in when entering. For example, in some cases, a single deck 608 may include multiple bays (e.g., 2 bays, 3 bays, 4 bays, 5 bays, and the like). Each of the multiple bays may have a floor which is not in plane with another bay. Furthermore, in some cases, a single deck 608 may not be entirely of a single plane or angle. For example, single deck 608 may have slight grade introduced in one or more portions. Slight grade in single deck 608 may match or parallel an outer mold line of aircraft. While a single deck 608 need not be comprised of a single plane, a single deck 608 may be characterized by its not having another deck directly above or below it.

Continuing with reference to FIG. 6, a plane coincident with single deck 608 may be conceptualized as a horizontal line, coincident with the single deck 608, extending across FIG. 6. In some embodiments, one or more of nose gear 620*a-b*, main gear 624*a-b*, and gear housing may be located within a position that intersects or otherwise overlaps with plane coincident with single deck 608. Said another way, in some cases, at least a portion of one or more of nose gear 620*a-b*, main gear 624*a-b*, and gear housing may be at substantially a same height as single deck 608.

With continued reference to FIG. 6, aircraft 600 may include engine support structure 504. In some embodiments, engine support structure may include a first hoop structure 628*a* and a second hoop structure 628*b*. First hoop structure 628*a* and second hoop structure 628*b* may be consistent with plurality of hoop structures described above. In some embodiments, where plurality of hoop structures includes two hoop structures, as described above, the two hoop structures may include first hoop structure 628a and second hoop structure 628b. First hoop structure 628a and second hoop structure 628b may be located forward of a center of gravity of an engine assembly. Center of gravity of an engine assembly is labeled using C$_{GE}$ in FIG. 6. Location of C$_{GE}$ in FIG. 6 is merely exemplary and would depend on the precise design of the engine. In some embodiments, engine may be located aft of rear spar. Engine being located aft of rear spar may mean that every part of engine is located aft of a vertical plane extending from the aft most portion of rear spar. In some embodiments, an engine may be located aft of a rear spar of a main body of an aircraft. In some embodiments, an engine may be located aft of a rear spar of a main body of a transition between main body and wings of an aircraft. In some embodiments, an engine may be located aft of a rear spar of wings of an aircraft.

With continued reference to FIG. 6, further disclosure regarding, aircraft 600, single deck 608, passenger compartment 612, nose gear 620a-b, main gear 624 *a-b*, and the like, may be found in U.S. Nonprovisional application Ser. No. 17/478,683, filed on Sep. 17, 2021, and entitled "AIRCRAFT FOR COMMERCIAL AIR TRAVEL AND A METHOD OF MANUFACTURE," and U.S. Nonprovisional application Ser. No. 17/895,384, filed on Aug. 25, 2022, and entitled "AIRCRAFT FOR COMMERCIAL AIR TRAVEL AND A METHOD OF MANUFACTURE," each of which are incorporated herein by reference.

Figure 7:
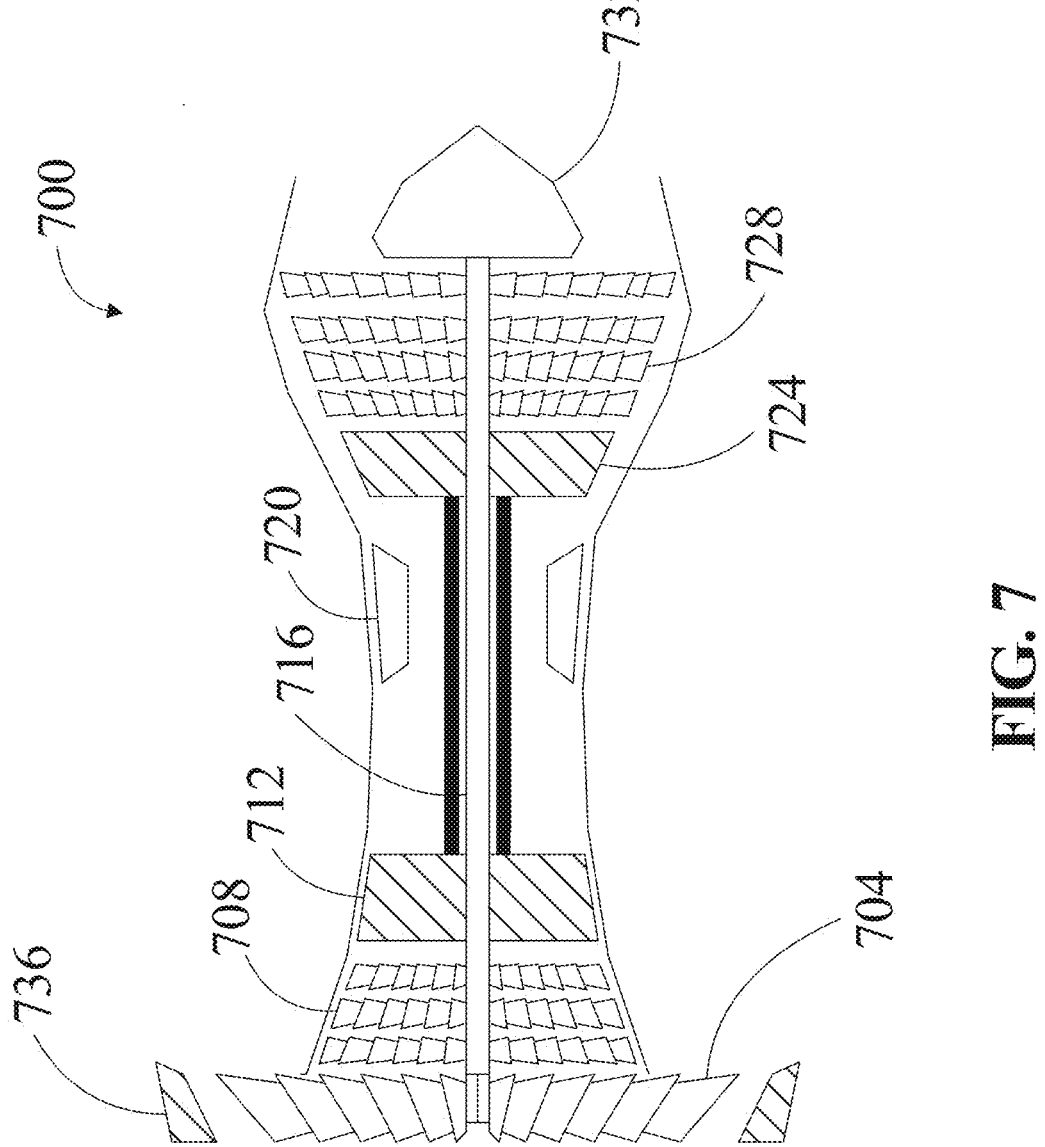
FIG. 7 is a cross section side view illustration of an exemplary engine.

Referring now to FIG. 7, an exemplary diagram of turbofan engine 700 is illustrated. In some embodiments, turbofan engine 700 may be located inside nacelle 736. Nacelle 736 may include any nacelle described herein. In some embodiments, turbofan engine 700 may include a fan 704, wherein the fan 704 rotates along with a fan shaft 716. In some cases, rotation of fan 704 and fan shaft 716 may be clockwise. In other cases, rotation of fan 704 and fan shaft may be counterclockwise. In some embodiments, fan 704 may include a plurality of fan blades. As used in this disclosure, a "fan shaft" is a rotating spindle on which a fan is mounted. In some embodiments, turbofan engine 700 may further include a plurality of air compressors. As used in this disclosure, an "air compressor" is a pneumatic device that converts power into potential energy stored in pressurized air. In some cases, air compressor may be gas turbine engine compressor. Gas turbine engine compressor may include, but is not limited to axial compressor, centrifugal compressor, mixed flow compressor, and the like thereof. In some embodiments, plurality of air compressors may include a low-pressure compressor 708, wherein the low-pressure compressor 708 increases pressure of airflow flow into turbofan engine 700 at a low pressure. In some embodiments, plurality of air compressors may further include a high-pressure compressor 712, wherein the high-pressure compressor 712 increase pressure of airflow flow into turbofan engine 700 at a high pressure. In some embodiments, plurality of air compressors may be mounted on a same shaft such as fan shaft 716. In other embodiments, each air compressor of plurality of air compressors may operate at a different speed.

With continued reference to FIG. 7, additionally, or alternatively, turbofan engine 700 may further include a combustion chamber 720. As used in this disclosure, a "combustion chamber" is an area within a turbofan engine where air is ignited. In some cases, combustion chamber 720 may inject fuel into airflow. Further, mixture of fuel and air may be combusted and pushed out of turbofan engine 700 in a form of energy. In some embodiments, turbofan engine 700 may further include a plurality of turbines. A turbine may include a device that convert energy in a stream of fluid into mechanical energy. In some cases, plurality of turbines may include a high-pressure turbine 724, wherein the high-pressure turbine 724 is a first turbine to receive airflow within turbofan engine 700 that efficiently extract work out of high-pressure airflow produced by plurality of compressors. In other cases, plurality of turbines may include a low-pressure turbine 728, wherein the low-pressure turbine 728 is a second turbine to receive airflow within turbofan engine 700 that efficiently extract work out of low-pressure airflow with a low-pressure ratio. In some cases, low-pressure turbine may minimize a negative impact on turbofan engine 700 performance caused by increased exhaust back pressure. Further, turbofan engine 700 may include a plug nozzle 732 at the end of turbofan engine 700, wherein the plug nozzle 732 is a type of nozzle which includes a center body or a plug around which the airflow exhausts. As will be appreciated by persons having ordinary skill in the art, after having read the entirety of this disclosure, the foregoing list is provided by way of example and components of turbofan engine 700 can be added as an extension or improving an aircraft disclosed herein.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
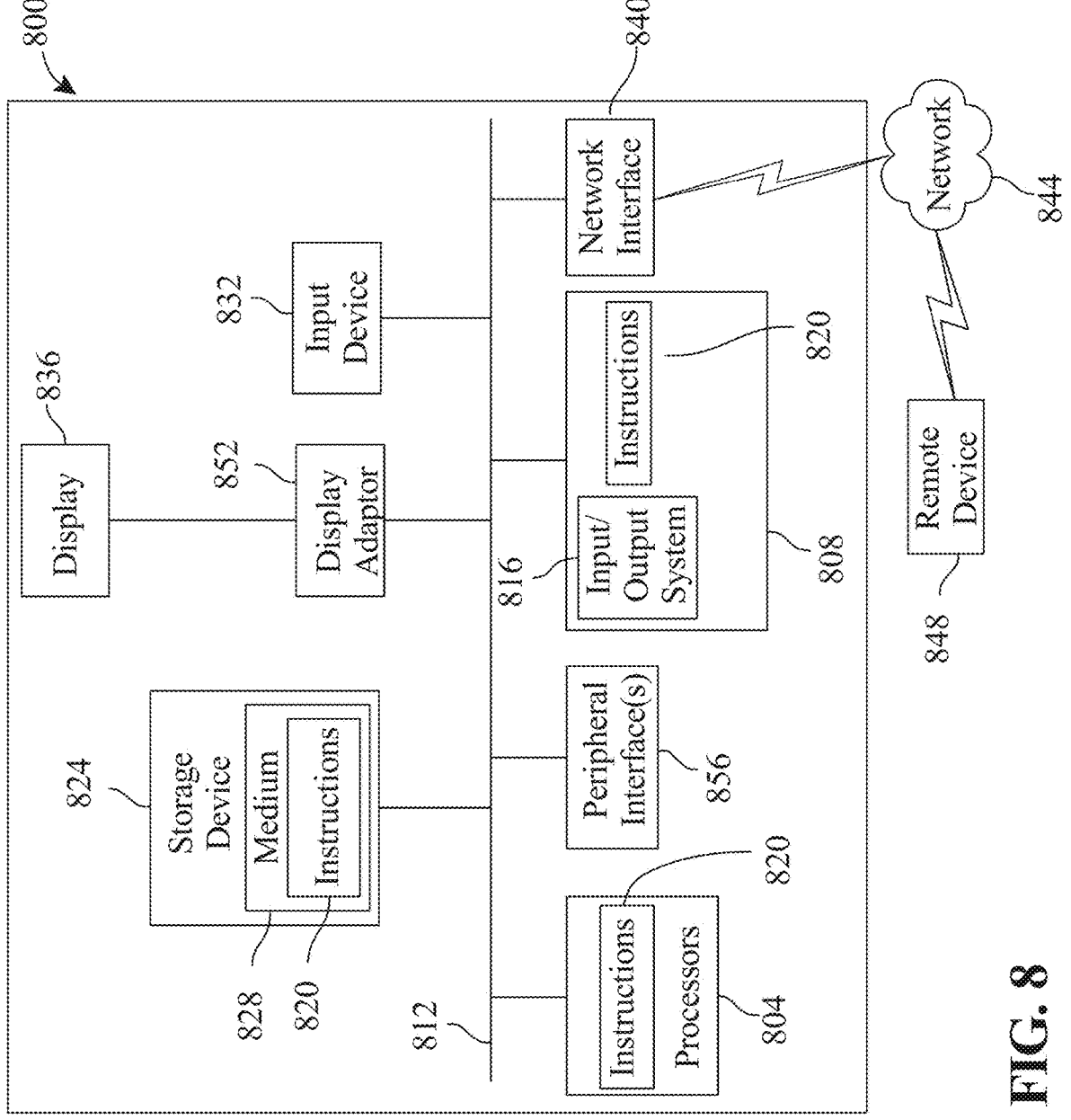
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1395 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840 may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A blended wing body aircraft comprising:

a main body comprising a pressure vessel, wherein the pressure vessel comprises a rear pressure bulkhead;

one or more ribs attached to an aft face of the rear pressure bulkhead:

a port wing and a starboard wing connected to the main body; and a first engine mechanically attached to at least a rib of the one or more ribs using an engine support structure comprising a plurality of hoop structures, including at least a first hoop structure located forward of a center of gravity of the first engine and at least a second hoop structure located aft of the center of gravity of the first engine.

2. The blended wing body aircraft of claim 1, wherein the pressure vessel comprises a passenger compartment.

3. The blended wing body aircraft of claim 1, further comprising a centerbody rear spar, wherein an entirety of the first engine is positioned aft of the entirety of the centerbody rear spar.

4. The blended wing body aircraft of claim 1, further comprising a second engine, wherein an entirety of the second engine is positioned aft of the entirety of the rear pressure bulkhead of the pressure vessel.

5. The blended wing body aircraft of claim 1, wherein all engines of the aircraft are positioned aft of a rear bulkhead of the pressure vessel.

6. The blended wing body aircraft of claim 1, wherein the plurality of hoop structures comprise a plurality of horseshoe structures, wherein each horseshoe structure of the plurality of horseshoe structures is configured to vertically restrain a position of the first engine.

7. The blended wing body aircraft of claim 1, wherein an entirety of the pressure vessel is outside of a rotor burst zone of the first engine.

8. The blended wing body aircraft of claim 1, wherein there is no clear demarcation between the wings and the main body of the aircraft along a leading edge of the aircraft.

9. The blended wing body aircraft of claim 1, further comprising a first fuel store, wherein an entirety of the first fuel store is outside of a rotor burst zone of the first engine.

10. The blended wing body aircraft of claim 9, further comprising a second fuel store and a second engine, wherein an entirety of each of a first and second fuel stores is outside of the rotor burst zone of the first engine and a rotor burst zone of the second engine.

11. The blended wing body aircraft of claim 10, wherein the first fuel store is positioned in a transition portion of blended wing body between the main body and the port wing, and wherein the second fuel store is positioned in a transition portion of blended wing body between the main body and the starboard wing.

12. The blended wing body aircraft of claim 1, further comprising a first fuel store, wherein an entirety of the first engine is positioned entirely aft of the first fuel store.

13. The blended wing body aircraft of claim 1, further comprising a first fuel store, wherein each engine of the aircraft is positioned entirely aft of an entirety of the first fuel store.

14. The blended wing body aircraft of claim 1, further comprising a first fuel store, wherein an entirety of the first engine is positioned entirely above the first fuel store.

15. The blended wing body aircraft of claim 1, further comprising a first fuel store, wherein each engine of the aircraft is positioned entirely above an entirety of the first fuel store.

16. The blended wing body aircraft of claim 1, wherein the first engine comprises a turbine.

17. The blended wing body aircraft of claim 1, wherein the first engine comprises a high pressure turbine and a low pressure turbine, wherein the high pressure turbine is configured to spin faster than the low pressure turbine.

18. The blended wing body aircraft of claim 17, wherein an entirety of the pressure vessel is outside of a rotor burst zone of the high pressure turbine.

19. The blended wing body aircraft of claim 17, further comprising a first fuel store, wherein an entirety of the first fuel store is outside of a rotor burst zone of the high pressure turbine.

20. A blended wing body aircraft comprising:

a main body comprising a pressure vessel, wherein the pressure vessel comprises a rear pressure bulkhead;

one or more ribs attached to an aft face of the rear pressure bulkhead;

a port wing and a starboard wing connected to the main body; and a first engine mechanically attached to at least a rib of the one or more ribs using an engine support structure comprising a plurality of hoop structures, including at least a first hoop structure located forward of a center of gravity of the first engine and at least a second hoop structure located aft of the center of gravity of the first engine and wherein the first engine comprises a high pressure turbine and a low pressure turbine, wherein the high pressure turbine is configured to spin faster than the low pressure turbine, wherein the high pressure turbine is positioned aft of an entirety of the rear pressure bulkhead of the pressure vessel.

* * * * *